(12) United States Patent
Lüchinger et al.

(10) Patent No.: US 6,501,032 B2
(45) Date of Patent: Dec. 31, 2002

(54) SUPPORT DEVICE FOR A WEIGHING CELL, AND BALANCE INCORPORATING THE SUPPORT DEVICE

(75) Inventors: Paul Lüchinger, Uster (CH); Eduard Fringeli, Bubikon (CH); Siegfried Zeiss, Wolfhausen (CH)

(73) Assignee: Mettler-Toledo GmbH, Greifensee (CH)

( * ) Notice: Subject to any disclaimer, the term of this patent is extended or adjusted under 35 U.S.C. 154(b) by 119 days.

(21) Appl. No.: 09/789,946

(22) Filed: Jan. 10, 2001

(65) Prior Publication Data

US 2001/0015293 A1 Aug. 23, 2001

(30) Foreign Application Priority Data

Jan. 19, 2000 (DE) .......................... 100 01 896

(51) Int. Cl.[7] .......................... G01G 21/10; G01G 23/06
(52) U.S. Cl. ........................ 177/184; 177/187
(58) Field of Search ................. 177/184, 185, 177/186, 187, 188, 189

(56) References Cited

U.S. PATENT DOCUMENTS

| | | | | | |
|---|---|---|---|---|---|
| 4,254,841 A | * | 3/1981 | Loskill | .................. | 177/187 |
| 4,273,203 A | * | 6/1981 | Blawert et al. | ............. | 177/187 |
| 4,726,435 A | * | 2/1988 | Kitagawa et al. | ........... | 177/187 |
| 4,899,840 A | * | 2/1990 | Boubille | .................... | 177/187 |
| 5,054,566 A | * | 10/1991 | Freeman | .................... | 177/184 |
| 5,096,007 A | * | 3/1992 | Burkhard | .................... | 177/187 |
| 5,191,948 A | * | 3/1993 | Strickler | .................... | 177/188 |
| 5,521,334 A | * | 5/1996 | Freeman | .................... | 177/184 |
| 5,600,104 A | * | 2/1997 | McCauley et al. | .......... | 177/187 |
| 5,604,334 A | * | 2/1997 | Lüchinger et al. | .......... | 177/187 |
| 5,721,398 A | * | 2/1998 | Balsen et al. | .............. | 177/184 |
| 5,866,855 A | * | 2/1999 | Nachtigal | ................. | 177/187 |
| 6,069,325 A | * | 5/2000 | Aoki | ......................... | 177/188 |

FOREIGN PATENT DOCUMENTS

| | | | | |
|---|---|---|---|---|
| CH | 680877 | | 11/1992 | |
| JP | 04-328426 | * | 11/1992 | .................. 177/189 |

* cited by examiner

*Primary Examiner*—Randy W. Gibson
(74) *Attorney, Agent, or Firm*—Friedrich Kueffner

(57) ABSTRACT

A support device for a weighing cell is mounted on one or more support posts resting on support springs that are connected to a stationary chassis and are pre-tensioned with an upward force. In case of a downward-directed shock, the support springs will yield to the inertial shock force and allow the weighing cell to move downward. The support posts can lift off from their resting places on the support springs, but are constrained by guide members to a limited range of upward vertical movement. A balance equipped with the support device has a low profile height and protects the weighing cell from downward- as well as upward-directed shocks.

10 Claims, 4 Drawing Sheets

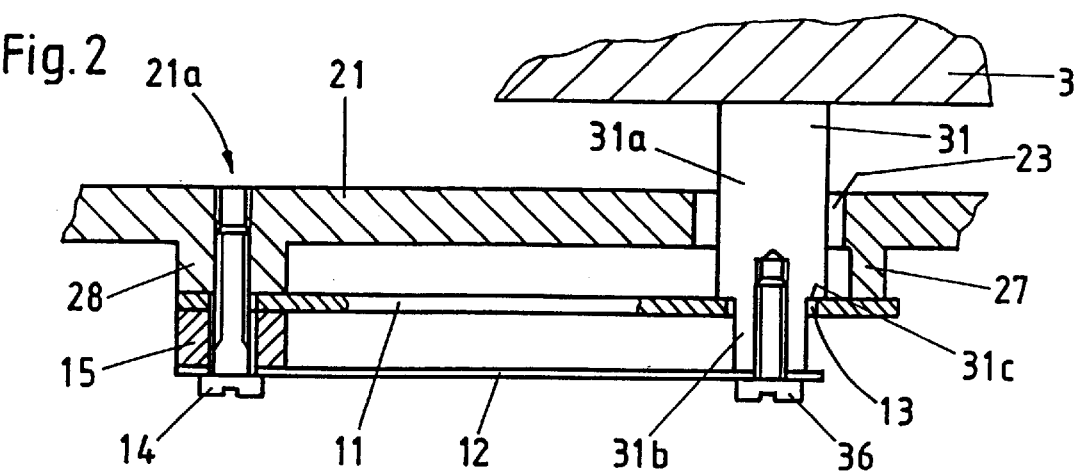
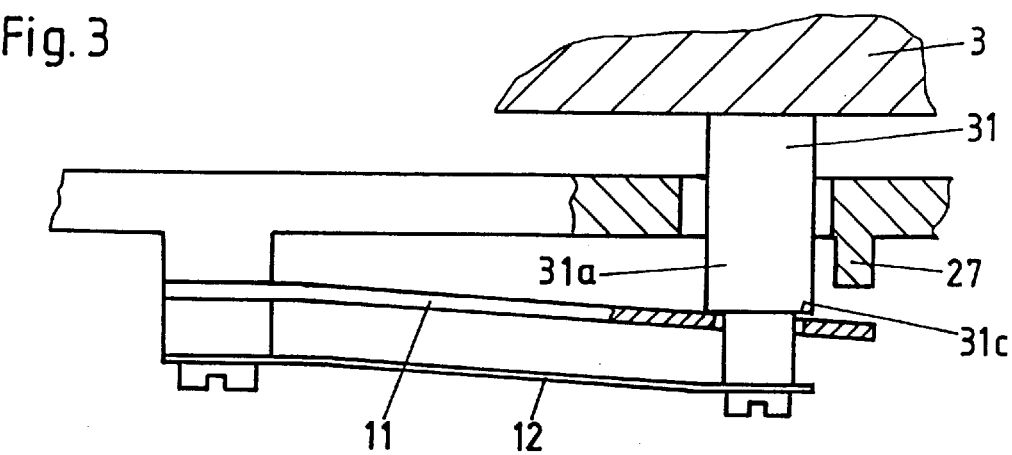
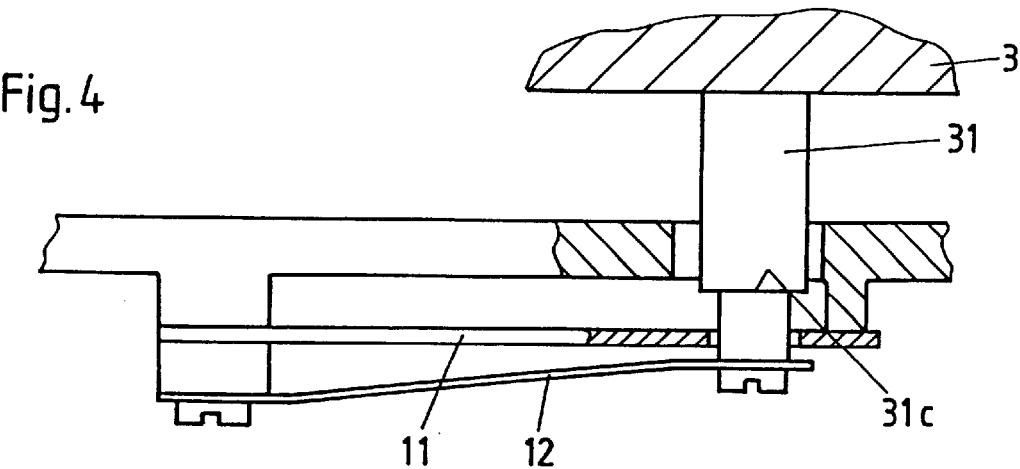

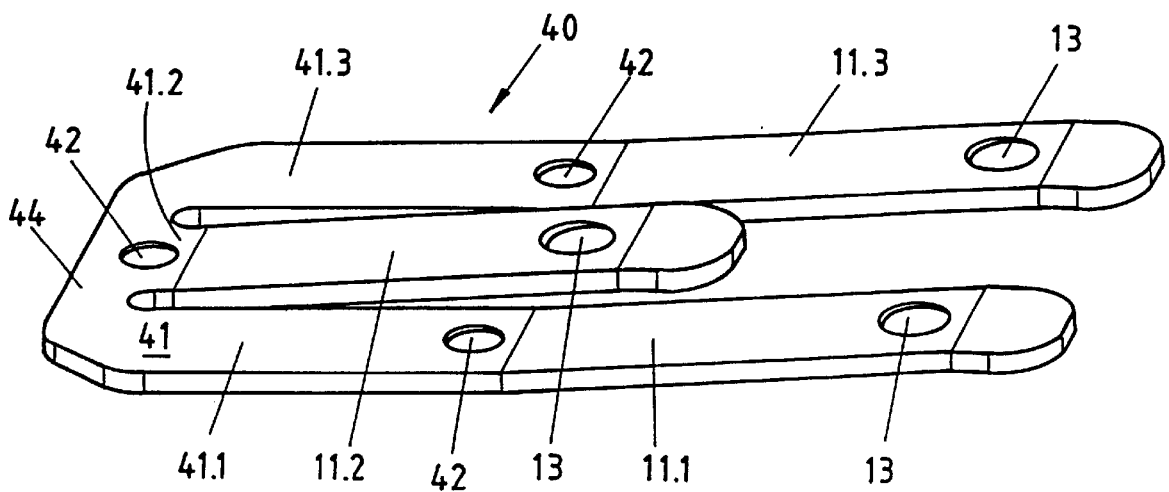
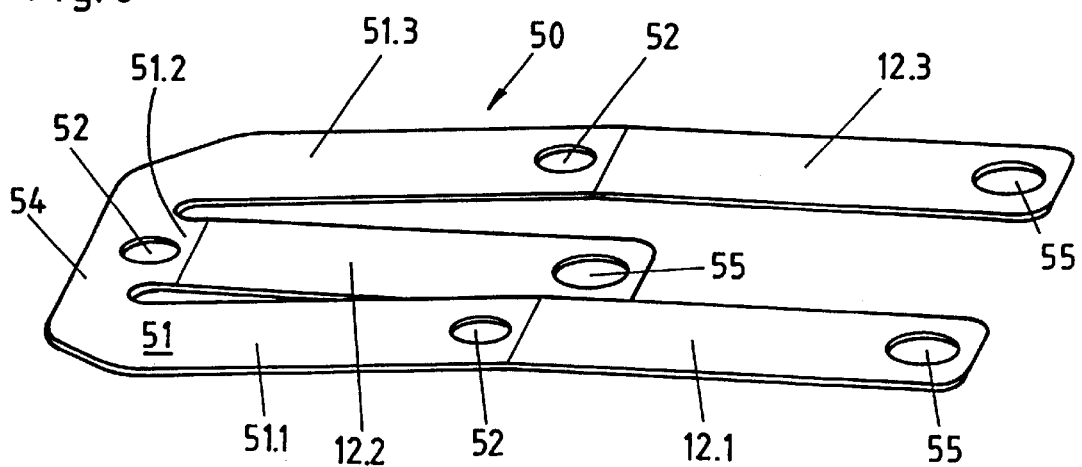

SUPPORT DEVICE FOR A WEIGHING CELL, AND BALANCE INCORPORATING THE SUPPORT DEVICE

BACKGROUND OF THE INVENTION

The present invention belongs to the field of shock protection devices for sensitive instruments. More specifically, it relates to a certain type of support device for a weighing cell and also to a balance with a stationary housing that incorporates the support device. In known support devices of the kind that the invention aims to improve, the weighing cell has one or more support posts by which the weighing cell is seated on a spring that is anchored at a stationary base or chassis portion, so that the one or more support posts of the weighing cell are movable in relation to the stationary chassis in a substantially vertical direction against the opposing force of the spring.

Measuring instruments that contain precision mechanisms can suffer damage if they are exposed to shocks in the course of being relocated or shipped, e.g., from being bumped, set down roughly, or even dropped. The risk of shock damage is particularly critical in high-resolution laboratory balances that incorporate levers, flexure pivots, parallelogram linkages and other delicate mechanical elements. Special shock protection measures have been attempted, so as to intercept excessive loads and thereby prevent damage to the sensitive parts of the apparatus. In the case of the aforementioned laboratory balances, the part that is most susceptible to damage is the weighing cell, including the force-introduction mechanism, particularly in regard to shocks in the downward vertical direction of the apparatus, i.e., in the same direction in which the device performs its actual weighing function. The most frequent problem with vertical shocks occurs when the apparatus is set down roughly after a change of place or after it has been lifted to clean the area underneath. In the field of balances, it is therefore a high-priority measure to keep downward-directed vertical shock loads from reaching the weighing cell. The problem is equally critical with shock forces acting in the opposite direction, for example if the balance is transported upside down or if it is turned on its head for cleaning.

One possibility of how shocks against the weighing cell can be softened is disclosed in CH-A-680877. This reference document describes a balance utilizing a printed circuit board, i.e., a component of the electronic circuitry contained in the balance, as a resilient support for the weighing cell. This design concept is conducive to a compact architecture of the instrument and provides a practical cushion against shock loads. However, in spite of the inherent damping properties of the printed circuit board, the system is susceptible to oscillations. For example, building vibrations can cause oscillations of the weighing cell. To correct this problem in high-resolution balances requires a time-consuming filtering process, and/or it is possible that the displayed weighing result will remain unstable.

OBJECT OF THE INVENTION

The present invention therefore has the object of providing a shock-absorbing means for a weighing cell that is effective against downward- as well as upward-directed vertical shocks and overcomes the aforementioned drawbacks while still allowing a compact, low-profile configuration of the apparatus.

SUMMARY OF THE INVENTION

In accordance with the present invention, the foregoing objective can be realized in a support device which, as described at the beginning, has one or more support posts that are connected to and support the weighing cell, where each support post rests on a support spring that is anchored at a stationary chassis portion, with the support post being movable in relation to the stationary chassis in a substantially vertical direction against the opposing force of the support spring. In addition, the support device of the present invention has the distinguishing features that each of the support springs on which the one or more support posts are resting is biased with an upward pre-tensioning force against a surface portion of the stationary base or chassis, and that the support post can lift off from its resting place on the support spring, but is constrained to a limited range of upward vertical movement by a guide member that is attached to the stationary chassis. Also included within the scope of the invention is a balance with a stationary housing that surrounds the weighing cell, where a bottom or floor portion of the housing is designed to accommodate the inventive support device and, more specifically, where the bottom or floor of the housing constitutes the stationary chassis on which the spring is anchored.

The inventive concept where the weighing cell is supported by one or more support posts resting on a support spring that is upward-biased with a pre-tensioning force provides a quasi-rigid support base for the weighing cell as long as the downward force transmitted by the support post(s) does not exceed the pre-tensioning force of the support spring. When the pre-tensioning force is exceeded, i.e., when a downward-directed shock is resiliently absorbed, the weighing cell deflects approximately in a mode of parallel motion, because of the guide member(s) constraining the support post(s). In other words, the weighing cell will not tip into a slanted position and, therefore, very little lateral clearance is required, which is again conducive to a compact design. As a further advantage, after the peak forces have subsided, the weighing cell will return to its exact previous position. In addition, the weighing cell can also lift off from its rest position on the support spring, so that an upward-directed vertical shock can likewise be absorbed.

In an advantageous development of the invention, the guide members are designed as guide springs with the capability of resiliently absorbing upward-directed vertical shocks, without the need for additional parts nor an increase in the profile height of the apparatus.

A particularly simple and at the same time space-saving configuration is achieved by designing the one or more support springs as leaf springs. Each of the support posts that support the weighing cell can be seated on a leaf spring in a straightforward manner, in particular with a design where the support post has two sections of different thickness, whereby a shoulder is formed by which the post rests on the support spring, with the thinner section of the bolt protruding through the support spring and the bottom end of the post being fastened to the guide member. In a preferred embodiment of the invention, each support spring is arranged to work together with a guide spring as a pair, in which the two springs run parallel to each other, with the advantageous result of a very low profile height.

By designing the guide members in the form of leaf springs, it is possible to combine multiple guide members that are used together in one support device into an integral die-punched unit. With appropriately shaped bends in the leaf springs, and with a suitable choice of the leaf dimensions, thickness and width in particular, it is possible to match the spring tension to given design constraints, primarily to the mass of the weighing cell and associated parts, and to performance requirements, in particular the magnitude of the shocks that the springs must be capable of absorbing. The design requirements for the support springs are analogous to the guide springs.

In a balance, the stationary base or chassis to which the support device is attached, is constituted by the stationary balance housing that encloses the weighing cell. In balances with a high measurement resolution, the space inside the housing is often subdivided into compartments in order to shield the weighing cell from being influenced by factors originating from other parts of the balance. Consequently, it is advantageous, for example, to use a design where the volume of the space surrounding the cell is minimized. In a preferred embodiment of a balance with the inventive support device, a minimum-volume configuration is achieved by a split-level design of the floor of the stationary housing, i.e., different parts of the floor being located at different levels. The purpose is to create a hollow space under a raised floor area below the weighing cell. This hollow space, which can be closed by a cover plate, can accommodate the support springs and the guide members in addition to other components of the balance. The raised floor area has openings through which the posts of the support device protrude into the hollow space. The support springs as well as the guide members are preferably of a leaf-spring design and are accommodated inside the hollow space, attached to the stationary housing floor from below.

In another embodiment, the stationary floor of the balance housing runs in a level plane, where the support springs and guide members are arranged above the floor. In this case it is advantageous to provide the floor with closable openings in the areas where the guide members are attached to the support posts in order to provide access for assembly and disassembly.

The invention is described below with reference to the drawing figures that illustrate preferred embodiments where the invention is incorporated in a micro-analytical balance and a top-loading precision balance. It must be understood, however, that the invention is not restricted to the specific design configurations described and illustrated herein, but that variations and adaptations that present themselves from the disclosure in its entirety are included within the scope of the invention.

BRIEF DESCRIPTION OF THE DRAWINGS

In the attached drawing:

FIG. 2 represents an enlarged detail of FIG. 1;

FIG. 3 represents the same detail as FIG. 2, with the support device in a downward-deflected condition;

FIG. 4 represents the same detail as FIGS. 2 and 3, with the support device in an upward-deflected condition;

FIG. 5 represents a die-punched unit with three support springs in the form of leaf springs;

FIG. 6 represents a die-punched unit with three guide members in the form of guide springs.

DETAILED DESCRIPTION OF PREFERRED EMBODIMENTS

Figure 1:
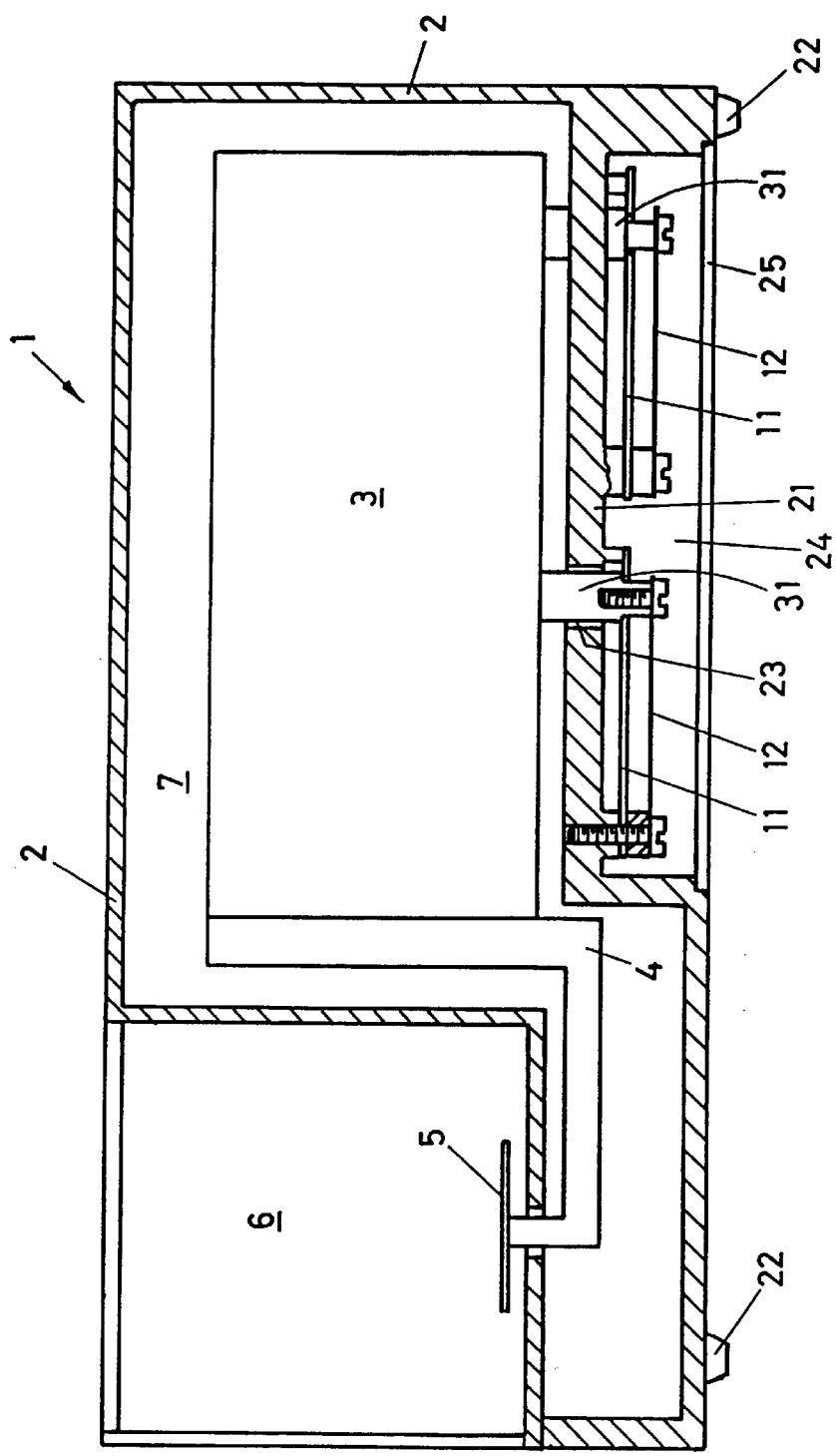
FIG. 1 represents a schematically simplified cross-sectional view of a micro-analytical balance.

FIG. 1 gives a schematic cross-sectional view of a micro-analytical balance 1 with a stationary housing 2. The housing 2 encloses a space 7 containing a weighing cell 3 with a load receiver arm 4. The latter protrudes through an opening into a weighing compartment 6, where a weighing pan 5 is supported on the load receiver arm. The stationary housing 2 has feet 22 resting on a stationary work surface, such as a weighing table (not shown). In the area below the weighing cell 3, the floor 21 of the stationary housing 2 is reinforced as well as raised to a higher level in comparison to other floor areas such as, e.g., below the weighing compartment 6. Details of the weighing cell 3, such as the weighing mechanism and magnet system, have no bearing on the present invention but can be found in other sources such as, e.g., U.S. Pat. Nos. 3,786,884 and 4,489,800. Attached to the weighing cell 3 are support posts 31 which, in this embodiment, are constituted by cylindrical bolts extending downwards through openings 23 in the housing floor. Each of the bolts rests on a support spring 11, and the bottom end of each bolt is connected to a guide member 12. The illustrated embodiment has three support posts 31. One of the posts is located in front of the cross-sectional plane of FIG. 1 and therefore not visible. The second post is shown in cross-section, while the third lies to the rear of the cross-sectional plane and is shown in frontal view. By raising the housing floor 21 in the area underneath the weighing cell 3, a hollow space 24 is created, which is closed off by a cover plate 25.

FIG. 2 shows the second of the posts, i.e., the post shown in cross-section in FIG. 1, and its support spring and guide spring in an enlarged and more detailed view. The drawing shows clearly how the bolt-shaped post 31 protrudes downward from the weighing cell 3 and passes with lateral clearance through an opening 23 in the housing floor 21. The post has two sections, i.e., an upper section 31a of larger diameter and a lower section 31b of smaller diameter. A shoulder 31c at the transition between the two sections serves as the seat surface of the post 31 on the pre-tensioned support spring 11. The thinner section 31b of the post 31 protrudes downward through a hole 13 of the support spring 11, and the bottom end of the thinner section 31b is fastened to the guide spring 12 by means of a screw 36. Immediately next to the clearance hole 23, the housing floor 21 has a downward-protruding portion in the shape of a ridge that serves as a resting pad 27 against which the support spring 11 is pre-tensioned. As is self-evident, there are also other ways of designing a feature or device for the support spring to rest against. The opposite end of the support spring 11 is rigidly attached to the housing floor 21, as is the stationary end of the guide spring 12. In the preferred embodiment illustrated in FIG. 2, the support spring and the guide spring are configured as a pair of parallel leaf springs that are both attached to the same location 21a of the housing floor 21. At the location 21a, the housing floor has a downward-protruding mounting pad 28 that is substantially flush with the resting pad 27. Thus, the support spring 11 in its pre-tensioned rest position will be substantially horizontal and parallel to the housing floor. A bushing 15 of a height that corresponds to the post section 31b reduced by the thickness of support spring 11 serves as a spacer for the guide spring 12. In the illustrated embodiment, the support spring 11 and guide spring 12 with the interposed spacer bushing 15 are attached to the mounting pad 28 by means of a screw 14. Consequently, the guide spring 12, too, will run substantially horizontal and parallel to the housing floor 21.

The guide spring 12 is likewise pre-tensioned, but in contrast to the support spring 11, the guide spring 12 is downward-biased. Thus, the guide spring 12 exerts a downward pull on the post 31 and thereby adds to the downward force of the post 31 against the support spring 11, i.e., to the combined weight of the weighing cell 3 together with its associated dead-weight components and the weighing load on the weighing pan. The pre-tension of the support spring 11 has to be at least sufficient so that the support spring 11 will not separate itself from the resting pad 27 under the force exerted by the post 31 against the support spring 11.

FIG. 3 illustrates the same portion of the support device as FIG. 2 (in a slightly different cross-sectional plane), where the support device is in the process of resiliently absorbing a downward shock force which could occur, e.g., if the balance is set down in an excessively abrupt manner. Yielding to the added inertial forces due to the sudden deceleration, the support spring 11 will deflect downward and thereby separate itself from the resting pad 27. The guide spring 12 has the effect of constraining the post 31 so that the vertical axis of the post remains parallel to itself during the downward deflection regardless of the magnitude of lateral or asymmetric forces that may act on the post 31 and the weighing cell 3, for example if the shoulder 31c of the support post 31 is not resting evenly on the support spring 11. After the peak forces have subsided, the support spring 11 returns to its non-deflected condition, with the guide spring ensuring that the post 31 ends up in exactly the same position that it had before the shock.

FIG. 4 illustrates how the support device reacts to a shock in the opposite direction of FIG. 3. This is unlikely when the apparatus is in its normal right-side-up position, because an abrupt deceleration of an upward movement hardly ever takes place. However, the condition could occur if the balance is turned upside down, even though FIG. 4 shows the device in upright orientation. The guide spring should be pre-tensioned sufficiently, so that in an upside-down position of the apparatus, the shoulder 31c of the support post 31 will not separate itself from the support spring 11 as a result of the weight force acting in a reverse direction on the weighing cell 3. Additional forces due to shocks are resiliently absorbed by the guide spring 12. In this situation, too, the guide spring ensures that the support post 31 moves substantially in the direction of the vertical post axis and returns to the same position that it had before the shock.

As a preferred embodiment of a feature of the invention, FIG. 5 illustrates a die-punched, substantially E-shaped component 40 of the support device with three parallel tongues representing support springs 11.1, 11.2 and 11.3 in the form of leaf springs that are connected through a U-shaped attachment portion 41. The three holes 42 in the legs and at the base of the U serve for the attachment of the component on the stationary base. Measured from the base 44 to the holes 42 the legs 41.1 and 41.3 are longer than the very short leg 41.2, so that the fixed ends of the leaf springs lie at the corners of a triangle. Each of the leaf springs 11.1, 11.2 and 11.3 extends from a hole 42 to the free end of its respective tongue. Next to each hole 42, the die-punched component 40 is crimped to a permanent slight upward bend, which produces the pre-tension or spring-bias force in the installed condition of the component 40. Each tongue has a hole 13 through which the section 31b of a bolt-shaped post 31 (see FIG. 3) extends downwards. The shoulder 31c of the post 31 rests on the rim of the hole 13.

As a preferred embodiment of another feature of the invention, FIG. 6 illustrates a die-punched, substantially E-shaped component 50 of the support device with three parallel tongues representing guide springs 12.1, 12.2 and 12.3, which are connected by a U-shaped attachment portion 51. The three holes 52 in the legs and at the base of the U serve for the attachment of the component on the stationary base at the same locations 21a as the attachment portion 41 of the component 40 (see FIGS. 2 and 5). Measured from the base 54 to the holes 52 the legs 51.1 and 51.3 are longer than the very short leg 51.2, so that the fixed ends of the guide springs lie at the corners of a triangle. Each of the guide springs 12.1, 12.2 and 12.3 extends from a hole 52 to the free end of its respective tongue. Next to each hole 52, the die-punched component 50 is crimped to a permanent slight downward bend which, in the installed condition, produces a downward pre-tension or spring-bias force. Each tongue has a hole 55, where the respective guide spring 12.1, 12.2 or 12.3 is screwed onto its associated post 31 (see FIG. 2).

In the example illustrated by FIGS. 5 and 6, the two die-punched units 40 and 50, respectively, each have three leaf springs at analogous locations. The triplet of base-attachment holes as well as the triplet of holes for the posts 31 are at the corners of essentially equilateral triangles. This geometry is not inherently required, although the three-point support recommends itself intuitively as a statically defined type of support arrangement. However, depending on the dimensions and the weight of the weighing system, a single support post may in some cases be sufficient. The arrangement of the posts and the strength of the support springs and guide springs depend on the configuration and weight distribution of the weighing cell. Thus, it is conceivable to use fewer or more than three support posts, although there appears to be no practical reason to have more than four.

Figure 7:
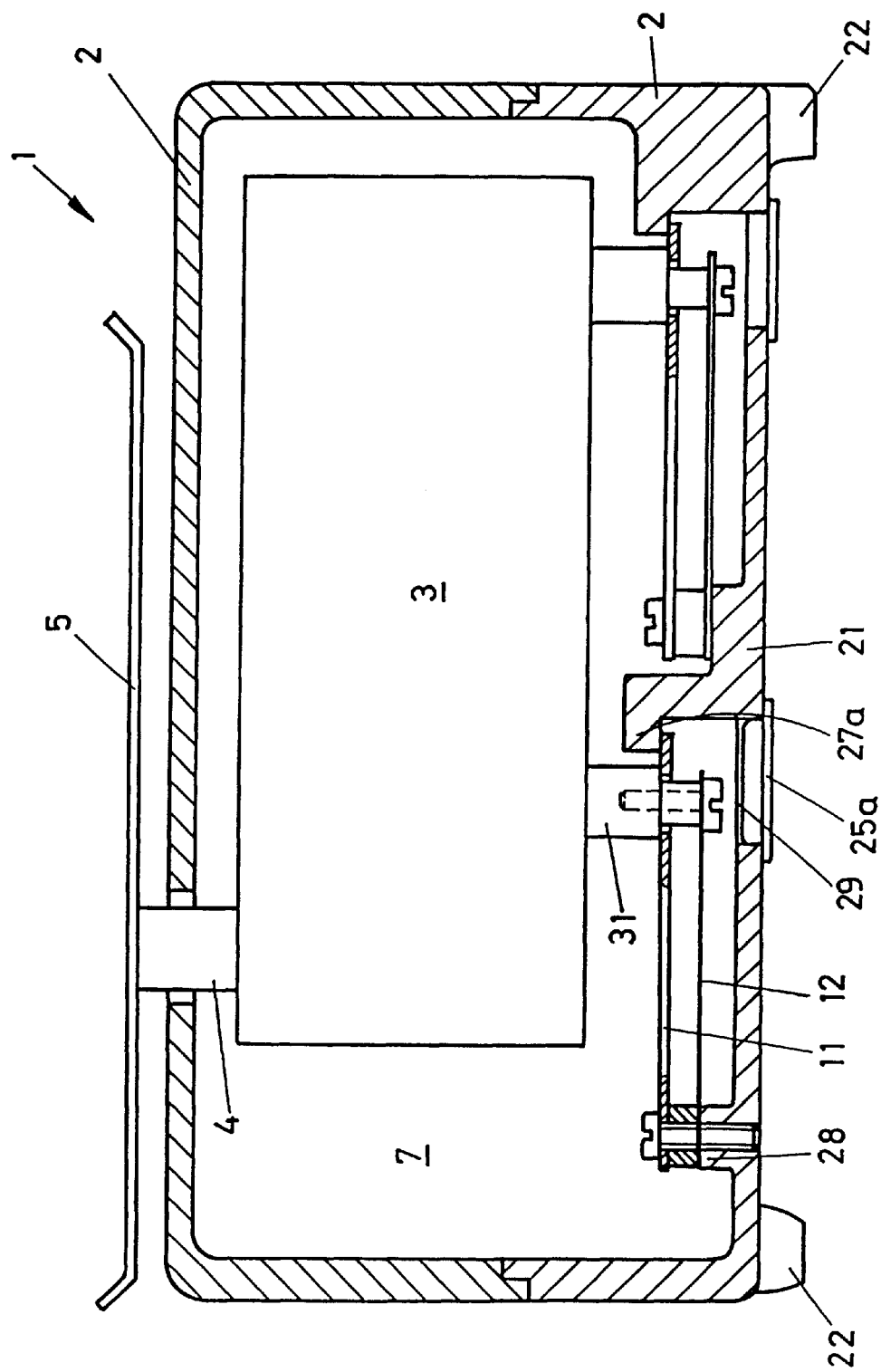
FIG. 7 represents a schematically simplified cross-sectional view of a top-loading precision balance.

An alternative embodiment of a balance is illustrated schematically in FIG. 7. Those parts that perform the same function as in the balance of FIG. 1 are identified by the same reference symbols. The balance of FIG. 7 is a top-loading precision balance 1, which does not have an enclosed weighing compartment. There is free access to the weighing pan 5 that receives the weighing load which, by way of the load receiver 4, is transmitted to the weighing cell 3. The weighing cell 3, together with a support device of the present invention, is arranged within the space 7 that is enclosed by the housing 2. By using the inventive concept for the supporting device, the profile height of the housing 2 can be kept very low. The balance has feet 22 resting on a support surface (not shown). The topside of the floor 21 has mounting pads 28 where the support springs 11 and the guide springs 12 are attached, as well as rest stops 27a, against which the support springs 11 are pre-tensioned. Except for the different geometry, the support device of FIG. 7 is analogous to the device of FIG. 2. In the device of FIG. 7, there is no need to have an opening in the housing floor 21 for the support post 31 to pass through. Instead, it is advantageous to provide an access hole 29 to facilitate the attachment of the guide spring to the support post by means of a screw. The access hole 29, as shown in FIG. 7, can easily be closed with a plug 25a.

It is considered self-evident that within the scope and principal concepts of the invention, numerous embodiments of the inventive support device with pre-tensioned support springs and guide springs are possible, and that the described and illustrated embodiments are meant only as examples and not as limitations of the scope of the invention.

What is claimed is:

1. A support device for a weighing cell, comprising at least one support post connected to and supporting the weighing cell, at least one support spring adapted for connection to a stationary chassis and supporting the at least one support post, and at least one guide member adapted for connection to the stationary chassis; wherein the support post is movable in relation to the stationary chassis in a substantially vertical direction against an opposing force of the at least one support spring;

the at least one support spring is biased with an upward pre-tensioning force against a surface portion of the stationary chassis, and the at least one support post can lift off from a resting place on the at least one support spring but is constrained to a limited range of upward vertical movement by the at least one guide member.

2. The support device of claim 1, wherein the at least one guide member is formed as a guide spring that is biased with a downward pre-tensioning force, thereby adding to a weight force that the support post exerts against the at least one support spring.

3. The support device of claim 1, wherein the at least one support spring is formed as a leaf spring.

4. The support device of claim 1, wherein the at least one guide member and the at least one support spring are formed as leaf springs cooperating as a pair and extending parallel to each other.

5. The support device of claim 4, wherein the at least one support post is cylindrical and comprises a large-diameter section and a small-diameter section separated by a shoulder by which the at least one support post rests on the at least one support spring, the small-diameter section protruding through the at least one support spring and having a bottom end releasably attached to the at least one guide member.

6. The support device of claim 2, comprising a plurality of support posts and a plurality of guide members, wherein the plurality of guide members is formed together as an integral die-punched unit.

7. The support device of claim 3, comprising a plurality of support posts and a plurality of support springs, wherein the plurality of support springs is formed together as an integral die-punched unit.

8. A balance with a stationary housing surrounding the weighing cell that is supported by the support device of claim 1, wherein the stationary housing has a floor that comprises the stationary chassis.

9. The balance of claim 8, wherein the floor comprises a raised floor area that extends at a higher level than other areas of the floor and has at least one passage hole for the at least one support post, and wherein further the at least one support spring and the at least one guide member are arranged below the raised floor area and are connected to the floor by connecting means accessible from below the floor.

10. The balance of claim 8, wherein the at least one support spring and the at least one guide member are arranged above the floor, and the floor has at least one opening giving access for connecting the at least one guide member to the at least one support post.

* * * * *